United States Patent
Holland et al.

(10) Patent No.: US 7,727,349 B2
(45) Date of Patent: Jun. 1, 2010

(54) METALLIC DOUBLE REPAIR OF COMPOSITE ARCUATE FLANGES

(75) Inventors: Brian K. Holland, Lansing, MI (US); William F. Bogue, Hebron, CT (US); Christopher J. Hertel, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 151 days.

(21) Appl. No.: 11/897,887

(22) Filed: Aug. 31, 2007

(65) Prior Publication Data

US 2008/0000193 A1 Jan. 3, 2008

Related U.S. Application Data

(63) Continuation-in-part of application No. 11/396,479, filed on Apr. 3, 2006, now Pat. No. 7,622,178.

(51) Int. Cl.
*B29C 73/00* (2006.01)
*B29C 65/00* (2006.01)
*B32B 43/00* (2006.01)
*B32B 37/00* (2006.01)
*B32B 3/26* (2006.01)

(52) U.S. Cl. ............................ 156/94; 156/98; 156/293; 428/63

(58) Field of Classification Search .................... 52/514, 52/514.5, 787.1; 16/2.5; 138/97, 98, 99; 29/402.01, 402.09, 402.11, 402.18; 156/94, 156/293, 294, 98; 264/36.1, 36.15, 36.16; 285/15, 16, 17, 45, 46, 47, 48, 50, 363, 406, 285/408; 428/63; 411/501; 464/181; 4/252.4, 4/252.5, 252.6
See application file for complete search history.

(56) References Cited

U.S. PATENT DOCUMENTS

| 2,146,461 A | 2/1939 | Bettington |
| 2,752,579 A | 6/1956 | Caldwell et al. |
| 4,003,288 A | 1/1977 | Jeal |
| 4,171,626 A | 10/1979 | Yates et al. |
| 4,173,128 A | 11/1979 | Corvelli |
| 4,323,603 A | 4/1982 | Close |
| 4,563,232 A | 1/1986 | Peake |
| 4,588,626 A | 5/1986 | Cologna et al. |
| 4,695,602 A | 9/1987 | Crosby et al. |
| 4,916,880 A | 4/1990 | Westerman, Jr. |
| 4,937,691 A | 6/1990 | Narayan et al. |

(Continued)

FOREIGN PATENT DOCUMENTS

| DE | 8333241 | 4/1984 |
| GB | 1551251 | 8/1979 |
| JP | 06034083 | 2/1994 |
| WO | 9412338 | 6/1994 |
| WO | 9829002 | 9/1998 |

OTHER PUBLICATIONS

Petrie, Edward M. Handbook of Adhesives and Sealants, McGraw-Hill, 2000, pp. 430-431.*
Jul. 30, 2007 European Search Report.
Mar. 31, 2009 European Search Report.

*Primary Examiner*—Richard Crispino
*Assistant Examiner*—Brian R Slawski
(74) *Attorney, Agent, or Firm*—Kinney & Lange, P.A.

(57) ABSTRACT

A doubler assembly repairs at least one damaged aperture of a composite flange. The doubler assembly includes an insert, an adhesive, and a support. The insert is positioned in the damaged aperture to provide compressive load transfer through the composite flange. The adhesive is positioned directly on at least a portion of the composite flange proximate the damaged aperture. The support is positioned over the adhesive.

18 Claims, 8 Drawing Sheets

U.S. PATENT DOCUMENTS

| | | |
|---|---|---|
| 5,059,059 A | 10/1991 | Cox |
| 5,168,385 A | 12/1992 | Kobayashi et al. |
| 5,185,890 A * | 2/1993 | Dismore et al. ............... 4/252.5 |
| 5,271,658 A | 12/1993 | Haldenwanger et al. |
| 5,876,651 A | 3/1999 | Blackburn, Jr. et al. |
| 5,965,240 A | 10/1999 | Blackburn et al. |
| 6,598,241 B1 * | 7/2003 | Williams ................... 4/252.1 |
| 2001/0023734 A1 | 9/2001 | Tavakoli et al. |
| 2001/0036559 A1 | 11/2001 | Haack et al. |
| 2003/0053882 A1 * | 3/2003 | Reuter ........................ 411/107 |

* cited by examiner

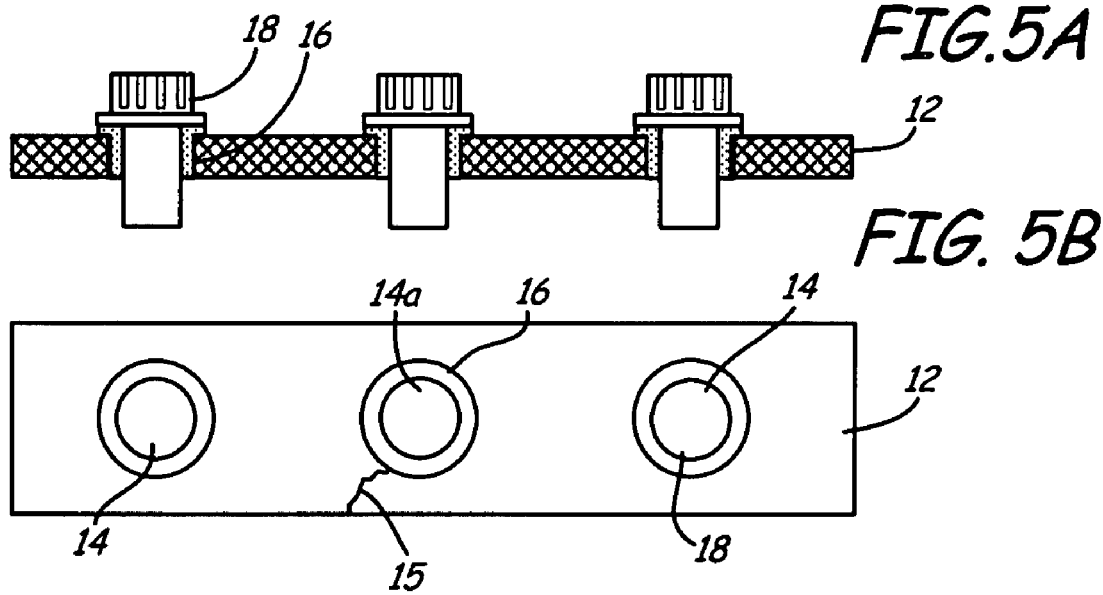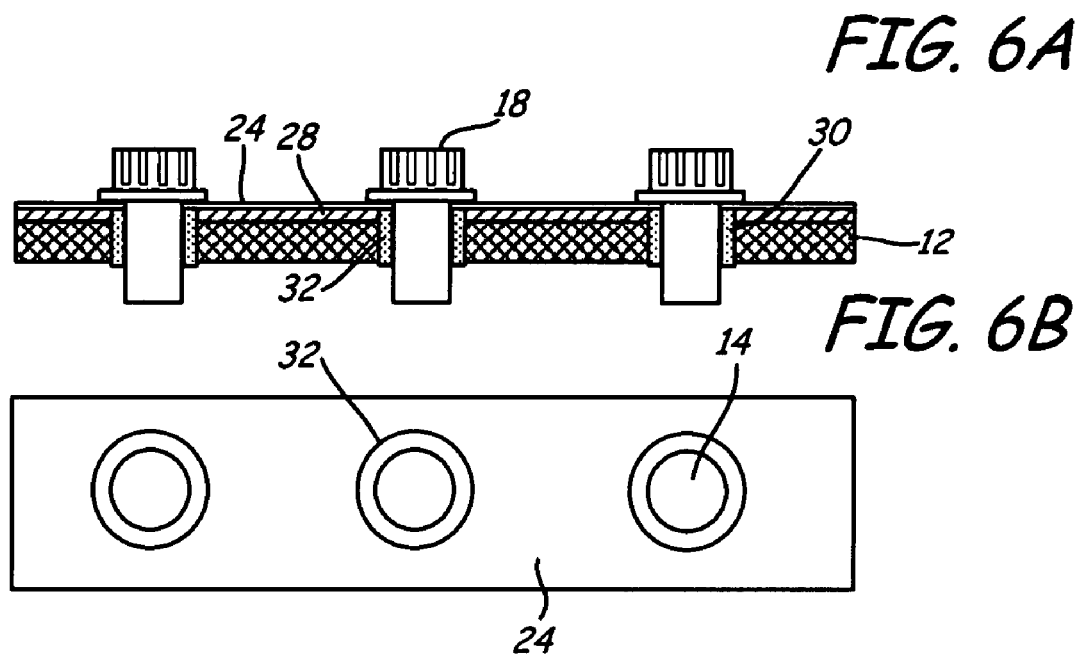

METALLIC DOUBLE REPAIR OF COMPOSITE ARCUATE FLANGES

CROSS-REFERENCE TO RELATED APPLICATION(S)

This application is a continuation-in-part of U.S. patent application Ser. No. 11/396,479, entitled METALLIC DOUBLER REPAIR OF COMPOSITE ARCUATE FLANGES, and filed on Apr. 3, 2006, the disclosure of which is incorporated by reference in its entirety.

BACKGROUND

The present invention generally relates to the field of repairing composite structures. In particular, the invention relates to doubler repair assemblies for composite arcuate flanges.

Composite structures that are formed of a thermoplastic material such as polyamideimide or polyetherimide are resistant to high temperatures and engine fluids. Thus, these composite structures can be exposed to extreme environments, such as hot engine oils in aircraft engines, which typically cause degradation of mechanical properties of most other elastomeric materials. However, while the composite structure may be temperature resistant, the composite structure and its parts are subjected to thermal stresses when rigidly attached to metal structures with significantly different coefficients of thermal expansion, causing cracks in the weaker composite structure. For example, arcuate flanges formed of composite materials can easily form cracks radiating from apertures in the flanges where the bolts are positioned. If left unattended, the thermal stresses of the environment may cause the crack to continue to extend to the edge of the flange and cause the entire flange to break.

Traditional repair techniques are limited to flange reconstruction techniques using fiberglass/epoxy laminates or either solvent or thermal welded replacement sections. Most of these current repair techniques result in a repair assembly that has inferior mechanical properties when compared to the original structure and also do not account for thermal disparity between parts. One method of repairing the damaged composite structure is to replace the entire structure. However, this can be a costly process, particularly if only a single aperture or only a small percentage of the composite structure is damaged. Another option is to restore only a piece or segment of the flange to a workable condition using a splint or doubler assembly that is applied to the damaged portion of the structure. Additional methods of repairing a damaged composite structure are described in U.S. Pat. No. 5,876,651 and U.S. Pat. No. 5,965,240, issued to Blackburn et al.

SUMMARY

A doubler assembly repairs at least one damaged aperture of a composite flange. The doubler assembly includes an insert, an adhesive, and a support. The insert is positioned in the damaged aperture to provide compressive load transfer through the composite flange. The adhesive is positioned directly on at least a portion of the composite flange proximate the damaged aperture. The support is positioned over the adhesive.

BRIEF DESCRIPTION OF THE DRAWINGS

FIG. 5A is a partial side view of a damaged arcuate flange.

FIG. 5B is a partial top view of the damaged arcuate flange of FIG. 5A.

FIG. 6A is a partial side view of a repaired arcuate flange having a doubler.

FIG. 6B is a partial top view of the repaired arcuate flange of FIG. 6A having a doubler assembly.

DETAILED DESCRIPTION

Figure 1:
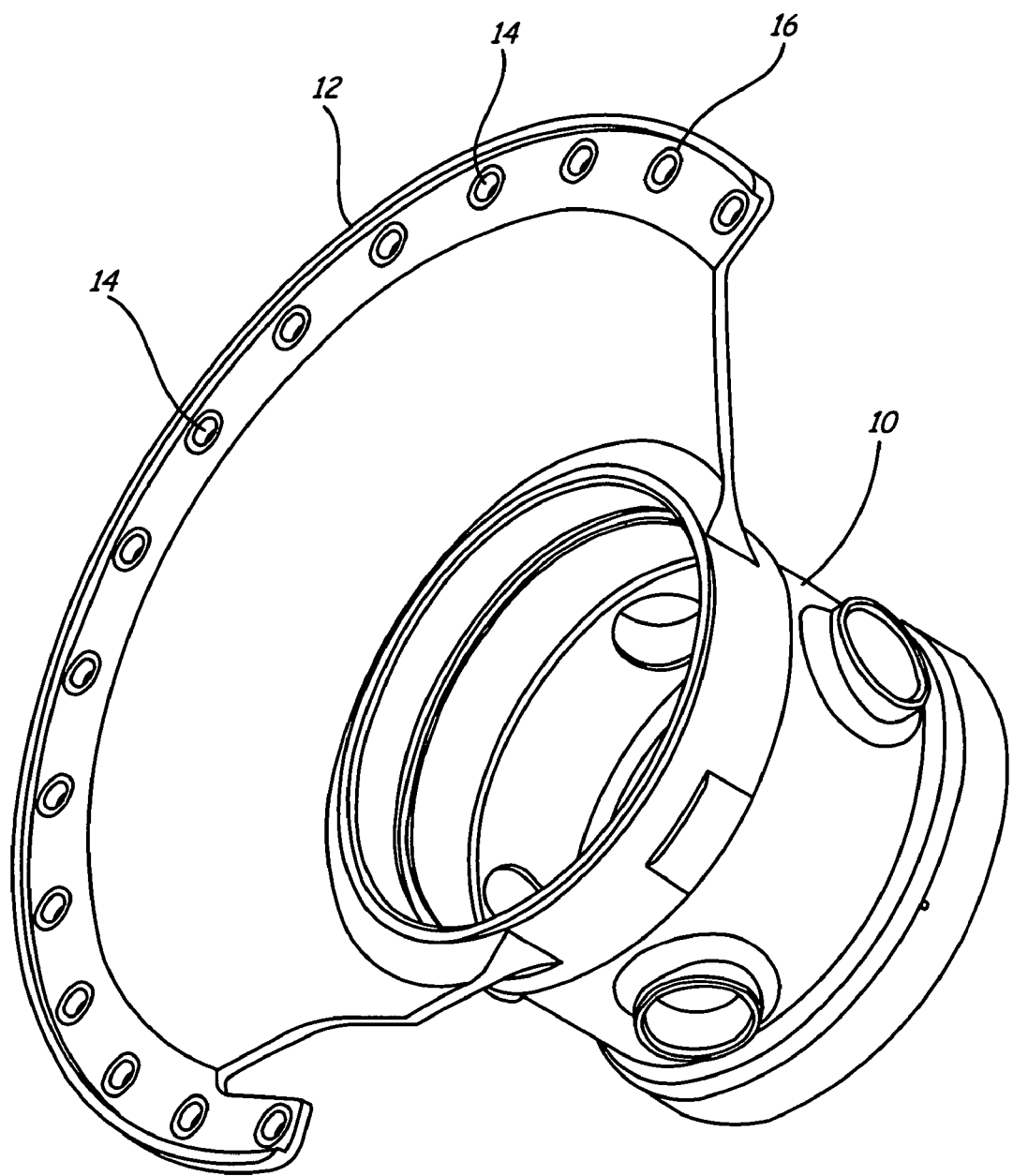
FIG. 1 is a perspective view of an arcuate flange having apertures.

FIG. 1 shows a perspective view of composite seal 10 with arcuate flange 12. Composite seal 10 is formed of a thermoplastic material and is typically exposed to extreme environments such as high-temperature jet engine oils. Arcuate flange 12 extends from composite seal 10 and has a plurality of apertures 14 along its perimeter. Bushings 16 and bolts 18 (shown in FIG. 5A) are positioned within apertures 14 of arcuate flange 12 and are used to connect composite seal 10 to a structure, such as a gearbox housing. Due to the extreme environment in which composite seal 10 is typically located, thermal stress resulting from coefficient of thermal expansion mismatches is constantly exerted on composite seal 10, and particularly on apertures 14 of arcuate flange 12. Thus, the area proximate apertures 14 can crack, with the crack typically radiating outward on arcuate flange 12 to the perimeter of composite seal 10.

Figure 2:
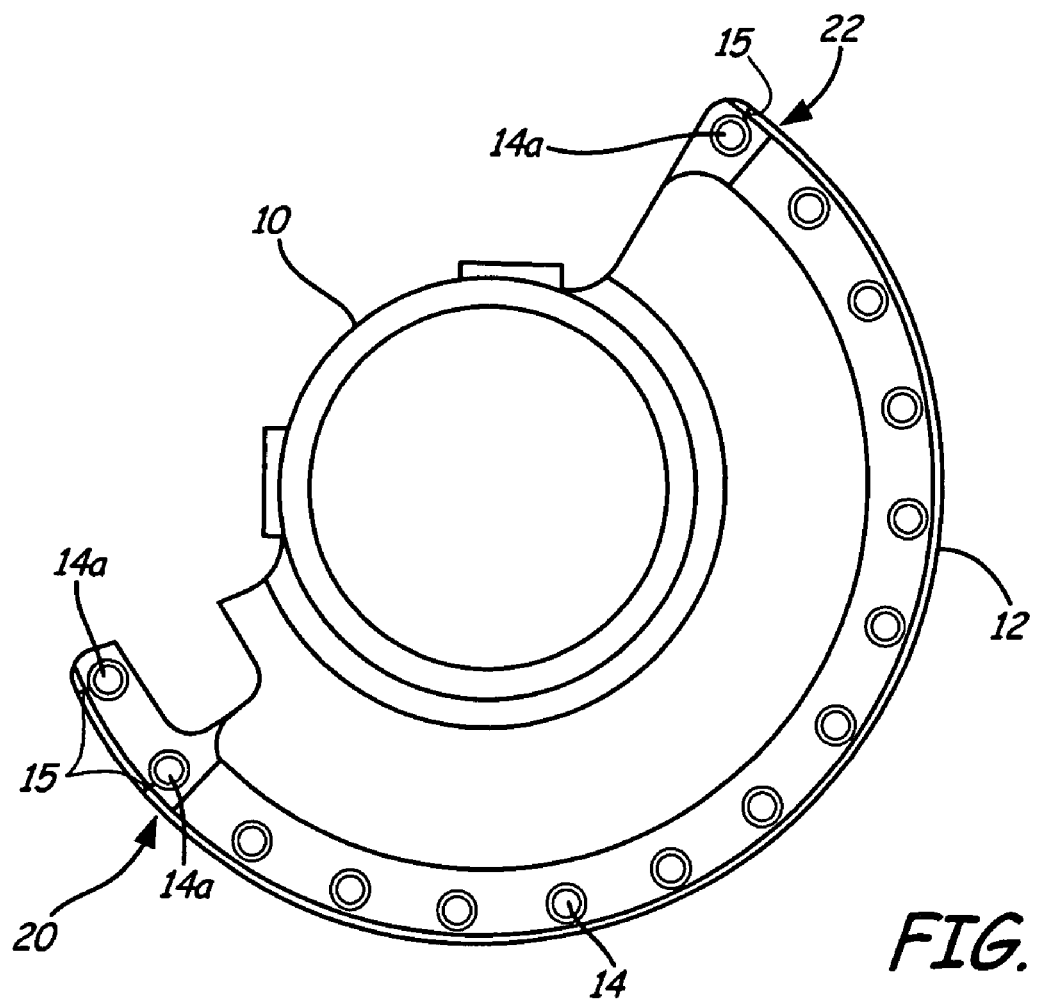
FIG. 2 is a top view of the arcuate flange having damaged ends.

FIG. 2 shows a top view of arcuate flange 12 having a damaged aperture 14a with crack 15 at wing end 20 and a damaged aperture 14a with crack 15 at non-wing end 22. Arcuate flange 12 could be repaired by conventional methods by trimming the cantilevered area, or the area proximate the damaged apertures 14a to remove damaged wing end 20 and damaged non-wing end 22 from arcuate flange 12, leaving only the undamaged apertures 14 on arcuate flange 12. Alternatively, the systems and methods of this invention can be used to repair such damage.

Figure 3:
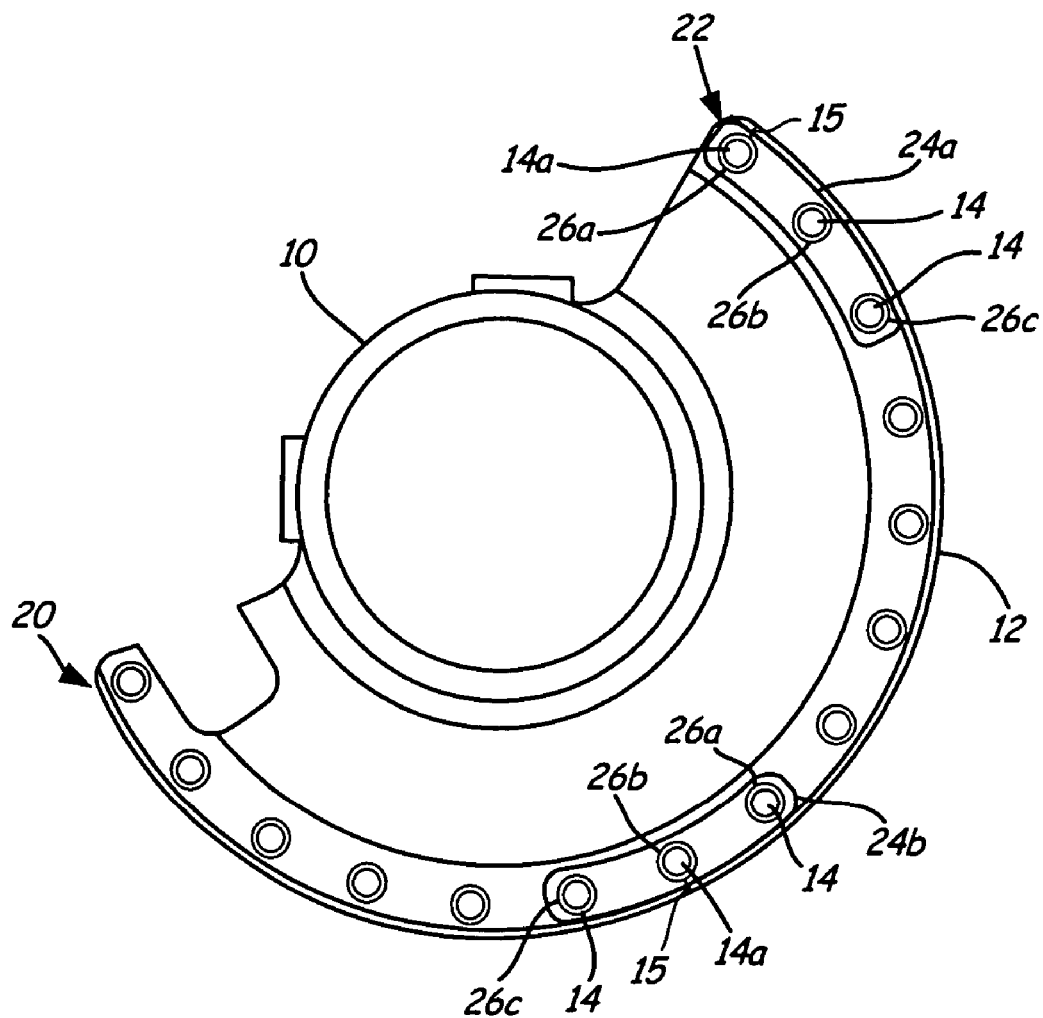
FIG. 3 is a top view of the arcuate flange having a three-hole doubler in two different locations.

FIG. 3 shows a top view of arcuate flange 12 having doubler 24, and specifically, two different three-hole doublers 24a and 24b. The following general discussion involving doubler 24 refers to all doublers subsequently disclosed. Doubler 24 is preferably fabricated having holes 26 with a diameter similar to apertures 14 of arcuate flange 12 to overlap damaged aperture 14a as well as undamaged apertures 14 proximate damaged apertures 14a. Doubler 24 is preferably formed of a material that is stronger than the material of composite arcuate flange 12 and that has a coefficient of thermal expansion similar to the coefficient of thermal expansion of the material that arcuate flange 12 is rigidly attached to. That allows the damaged area of arcuate flange 12 to be strengthened by doubler 24, which is designed to act as a repair of an existing part. Cracks 15 radiating from damaged aperture 14a can be bridged using doubler 24, which is operatively connected (i.e. bonded) to arcuate flange 12. While those skilled in the art will understand that doubler 24 can be made of any suitable material, in one embodiment, doubler 24 is made of stainless steel.

First and second three-hole doublers 24a and 24b as shown in FIG. 3, represent two exemplary uses of three-hole doubler 24. In these particular embodiments, only one aperture 14a covered by each three-hole doubler 24a or 24b is damaged, while the remaining two apertures 14 covered by each three-hole doubler 24a or 24b are undamaged. In first doubler 24a, damaged aperture 14a is at non-wing end 22 of arcuate flange 12. First doubler 24a is thus positioned on arcuate flange 12 such that an end hole 26a of first doubler 24a is positioned over damaged aperture 14a, while the remaining two holes 26b and 26c of three-hole doubler 24a are positioned over undamaged apertures 14.

Second doubler 24b is positioned on arcuate flange 12 such that center hole 26b of second doubler 24b is positioned over damaged aperture 14a, while the remaining two holes 26a and 26c of three-hole doubler 24b are positioned over undamaged holes 14. In some embodiments, it may be desirable to have no more than six of the fifteen apertures 14 of arcuate flange 12 covered by doublers 24, with no more than two damaged apertures 14a having cracks 15 radiating therefrom. As shown in FIG. 3, three-hole doublers 24a and 24b may be most effective if only one of the three apertures that three-hole doublers 24a and 24b cover is damaged, but other embodiments are also possible.

Figure 4:
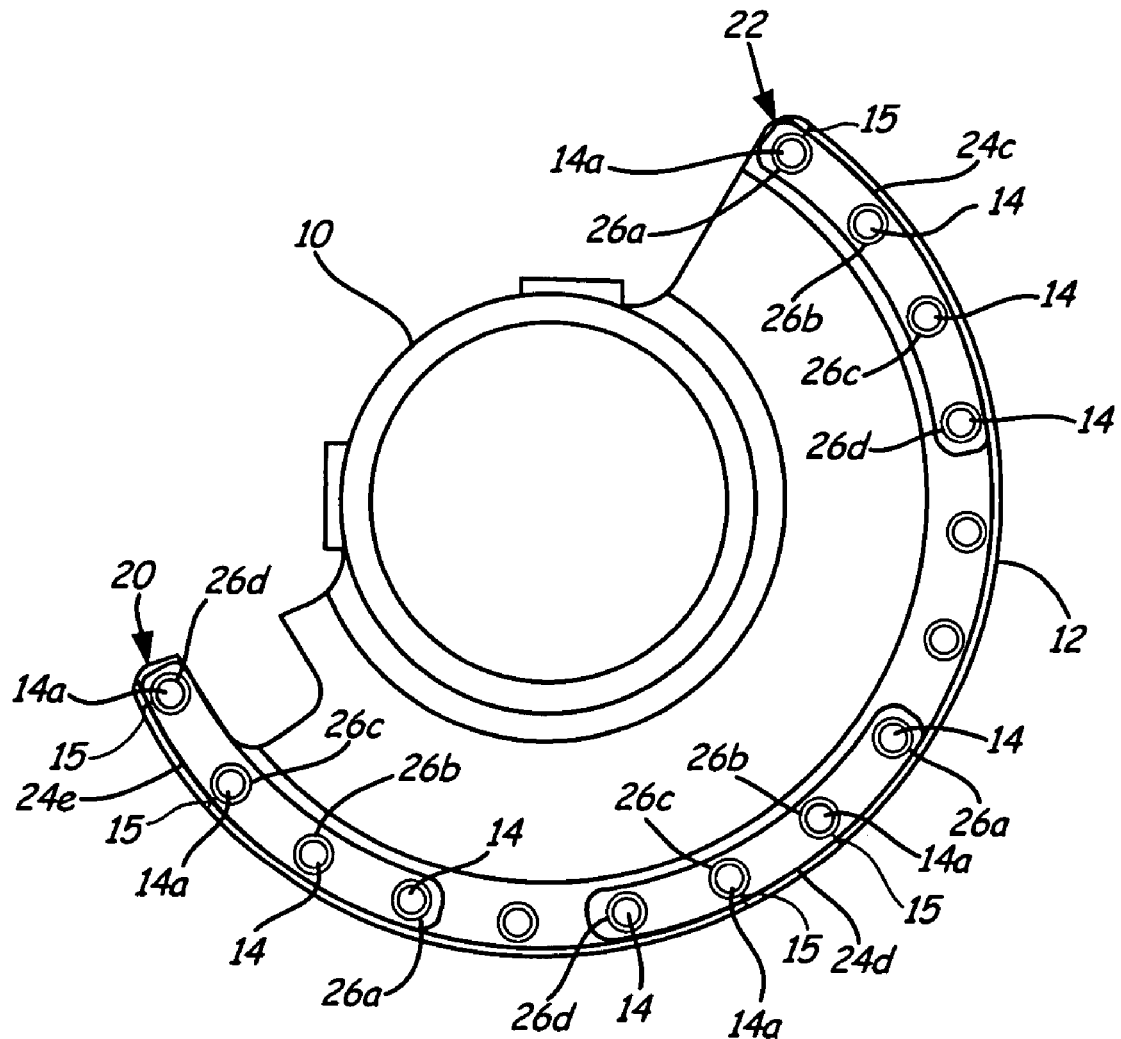
FIG. 4 is a top view of the arcuate flange having a four-hole doubler in three different locations.

Three different exemplary uses of four-hole doublers are shown in FIG. 4. Four-hole doublers 24c-24e function in the same manner as three-hole doublers 24a and 24b, except that four-hole doublers 24c-24e are designed with four-holes, rather than just three. In four-hole doubler 24c, damaged aperture 14a is on non-wing end 22 of arcuate flange 12. Four-hole doubler 24c is thus positioned on arcuate flange 12 such that an end hole 26a of third doubler 24c is positioned over damaged aperture 14a, while the remaining three holes 26b-26d of four-hole doubler 24c are positioned over undamaged apertures 14. In some embodiments, the last hole 26d of four-hole doubler 24c will cover an undamaged aperture 14, and at least one of the middle holes 26b and 26c will also cover an undamaged aperture 14.

Four-hole doubler 24d is shown being used to repair two adjacent damaged apertures 14a. To repair arcuate flange 12, four-hole doubler 24d may be positioned on arcuate flange 12 such that center holes 26b and 26c of four-hole doubler 24d are positioned over damaged apertures 14a, while end holes 26a and 26d are positioned over undamaged apertures 14 on either side of damaged apertures 14a.

Four-hole doubler 24e is shown being used to repair two other adjacent damaged apertures 14a on wing end 20 of arcuate flange 12. Four-hole doubler 24e is positioned on arcuate flange 12 such that end hole 26d and center hole 26c of four-hole doubler 24e are positioned over damaged apertures 14a, while end hole 26a and center hole 26b are positioned over undamaged apertures 14. In some embodiments, it may be desirable to have no more than eight out of fifteen apertures 14 covered by doublers 24 with no more than four damaged apertures 14a having cracks 15 radiating therefrom. As shown in FIG. 4, four-hole doublers 24c-24e may be most effective if only two of the four apertures that four-hole doublers 24c-24e cover are damaged, but other embodiments are also possible.

FIGS. 5A and 5B show a partial side view and a partial top view, respectively, of arcuate flange 12 with two undamaged apertures 14 and a damaged aperture 14a. In operation, a bushing 16 and a bolt 18 are positioned in each aperture 14 of arcuate flange 12. Bushing 16 provides a compressive load path for bolt 18 through arcuate flange 12. When exposed to high thermal stress, apertures 14 may exhibit damage in the form of cracking. Damaged aperture 14a can be distinguished by crack 15 radiating from damaged aperture 14a to the perimeter of arcuate flange 12. When arcuate flange 12 has a damaged aperture 14a, doubler 24 (shown in FIGS. 6A and 6B) may be used to repair arcuate flange 12.

FIGS. 6A and 6B show a partial side view and a partial top view, respectively, of arcuate flange 12 with doubler 24 installed. Doubler 24 is used to transfer the load across the damaged area of arcuate flange 12 and to provide compressive load distribution at apertures 14. A thin sheet, or thick film adhesive 28 may be positioned on top of the surface of arcuate flange 12 to act as an expansion joint between arcuate flange 12 and doubler 24. Before adhesive 28 is positioned on arcuate flange 12, holes 30 may be cut from adhesive 28 to allow inserts 32 to be positioned within apertures 14 and overlap apertures 14. Adhesive 28 may comprise any suitable material. In some embodiments, adhesive 28 may be a fluoroelastomer film that is stable in high temperature environments, for example, DuPont's Viton® fluoroelastomer, available from Eagle Elastomer, Cuyahoga Falls, Ohio. In some embodiments, it may be desirable to use a fluoroelastomer for adhesive 28 because of its rubbery and ductile properties, which allow for thermal expansion differences when heated to high temperatures. Additionally, fluoroelastomers may be employed for their fluid resistance, which is necessary in extreme environments, such as near hot aircraft engine oil. Doubler 24 may then be positioned over adhesive 28 and thereby become attached to arcuate flange 12, bridging the damaged area of arcuate flange 12.

Figure 7:
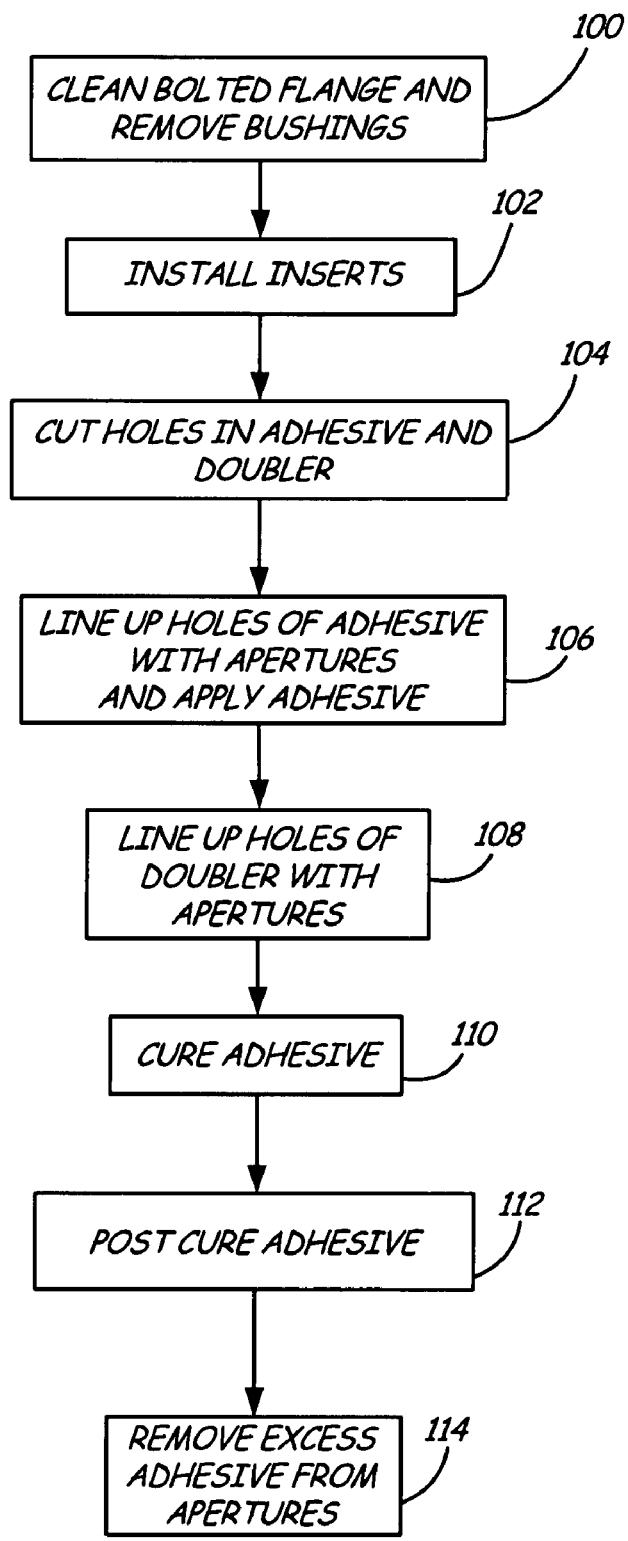
FIG. 7 is a block diagram of a method of installing the doubler to the arcuate

FIG. 7 shows an exemplary non-limiting method of installing doubler 24 to an arcuate flange 12 having one or more damaged apertures 14a. First, the surface of arcuate flange 12 may be cleaned and the cracked material may be trimmed away, if desired, as represented by Step 100. Any adhesive in damaged aperture 14a around bushing 16 may also be removed. Additionally, any remaining bushings 16 in apertures 14 on either side of damaged aperture 14a may also be removed.

In some embodiments, repair inserts 32 may then be attached to arcuate flange 12 in any suitable manner, such as by being tack welded to doubler 24 or bonded to arcuate flange 12, as represented by Step 102. Inserts 32 may comprise any suitable material, such as for example, a metallic material. In some embodiments, inserts 32 can be bonded with a high temperature epoxy to damaged apertures 14a, replacing the original bushings 16. Inserts 32 provide a load transfer path through arcuate flange 12 by extending beyond both faces of arcuate flange 12. The rigid bond created by inserts 32 may help restore damaged apertures 14a. In another embodiment, inserts 32 may be tack welded to metallic doubler 24 for certain locations, such as on wing end 20 or non-wing end 22 where arcuate flange 12 is trimmed away to remove damage, where doubler 24 may be cantilevered over the area that wing end 20 or non-wing end 22 previously occupied to prevent misalignment of arcuate flange 12 during assembly.

In some embodiments, holes 30 may then be cut from adhesive 28 to match up with apertures 14 of arcuate flange 12. Doubler 24 is preferably machine-holed with any appropriate number of holes, depending on the needs of the particular arcuate flange 12 (represented by Step 104). After lining up holes 30 in adhesive 28 with inserts 32 positioned in apertures 14 and damaged aperture 14a of arcuate flange 12, adhesive 28 may be applied to the surface of arcuate flange 12, Step 106. Holes 26 of doubler 24 may then be aligned with apertures 14 and 14*a* and inserts 32, Step 108. In some embodiments, it may be preferable to prevent bonding between inserts 32 and doubler 24. In some embodiments, doubler 24 may be mechanically clamped to arcuate flange 12 while adhesive 28 is curing.

When adhesive 28 is initially positioned on arcuate flange 12, adhesive 28 is preferably in a semi-cured state. Adhesive 28 may then be heated to a temperature sufficient to cure adhesive 28 to arcuate flange 12 and doubler 24, as represented by Step 110. Adhesive 28 may also be cured at a sufficient pressure to bring adhesive 28 into contact with both arcuate flange 12 and doubler 24. In some embodiments, adhesive 28 may be heated to a temperature of approximately 320° F. to 360° F. (160° C. to 182° C.) for approximately fifteen minutes to thirty minutes under vacuum or at a pressure of approximately 10 pounds per square inch (psi) to 100 psi (68.95 kPa (kN/m$^2$) to 689.5 kPa). Doubler 24 may then be allowed to cool to approximately 150° F. (65.6° C.) before removing the clamp. After doubler 24 has cooled down, adhesive 28 may then be post cured, Step 112. In some embodiments, adhesive 28 may be post cured by being heated to a temperature of approximately 340° F. to 360° F. (171° C. to 182° C.) for approximately two to four hours.

Any excess adhesive 28 may then be removed from apertures 14 and 14*a* while maintaining adhesive 28 around the perimeter of doubler 24, as represented by Step 114. Adhesive is preferably excluded between the contact surfaces of inserts 32 and doubler 24 so that adhesive 29 does not prevent load transfer between doubler 24 and inserts 32.

Figure 8:
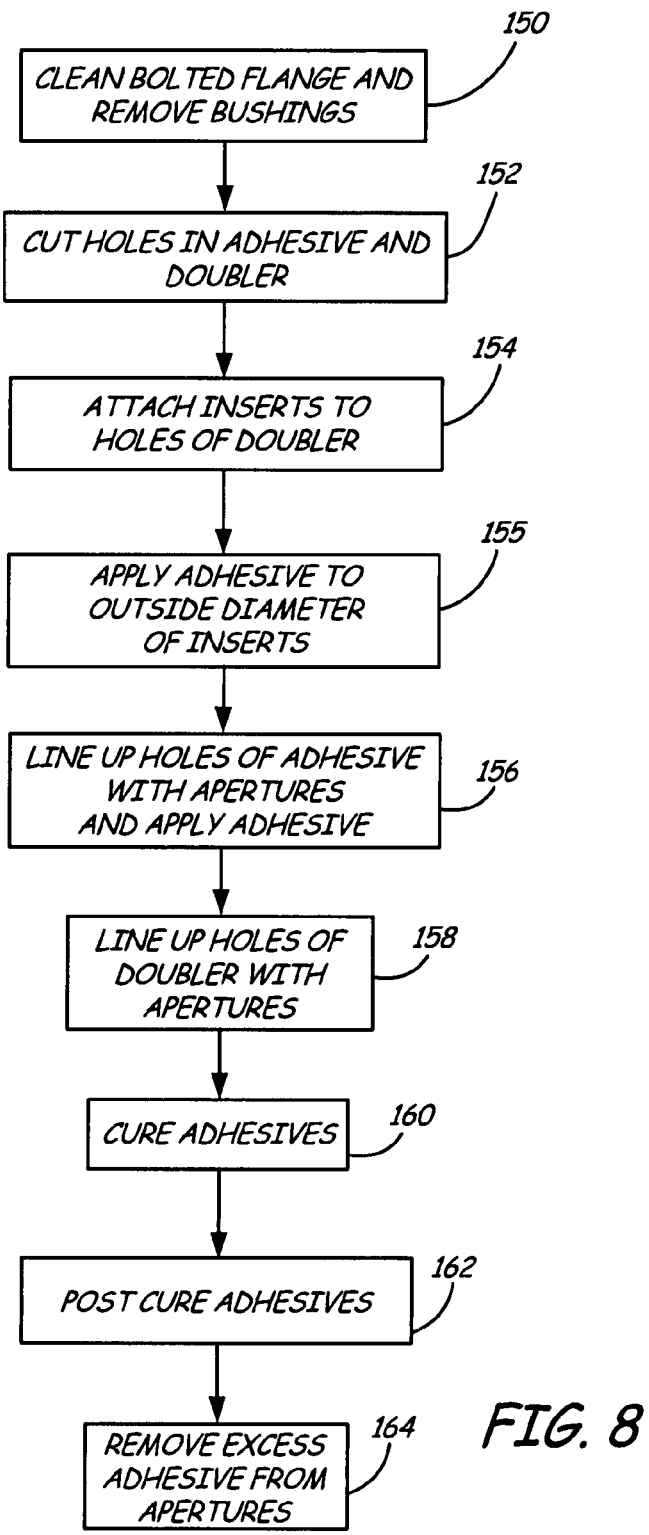
FIG. 8 is a block diagram illustrating an alternative method of installing the doubler to the arcuate flange.

FIG. 8 is a block diagram illustrating an alternative method of installing doubler 24 to arcuate flange 12. An initial step, as represented by Step 150, is similar to Step 100 of FIG. 7 and involves cleaning the arcuate flange 12 and trimming away cracked material at wing end 20 or non-wing end 22, as necessary. Bushing 16 is removed from damage aperture 14*a*, along with any adhesive. Bushings 16 in apertures 14 that surround damaged aperture 14*a* may also be removed.

In the method described above and shown in FIG. 7, inserts 32 are generally inserted right away into damaged aperture 14*a* and surrounding apertures 14 of flange 12. In contrast, in the method shown in FIG. 8, inserts 32 are first attached to doubler 24, Step 154. Thus, prior to Step 154, doubler 24 and adhesive 28 are prepared by forming holes 26 in doubler 24 and holes 30 in adhesive 28, Step 152. (This is similar to Step 104 of FIG. 7.) Holes 26 and 30 are configured to be equivalent in size to damaged aperture 14*a* and surrounding apertures 14. Then, in Step 154, inserts 32 are attached inside holes 26 formed in doubler 24. In one embodiment, inserts 32 are welded inside holes 26 of doubler 24. Specifically, inserts 32 may be tack-welded inside holes 26.

In the embodiment of FIG. 8, inserts 32 are attached to doubler 24 before positioning inserts 32 into damaged aperture 14*a* and surrounding apertures 14 of arcuate flange 12. As mentioned above in reference to FIG. 7, inserts 32 may eventually be bonded to apertures 14 using a high temperature epoxy or other suitable adhesive. Step 155 includes application of an epoxy adhesive to an outside diameter of inserts 32 so that inserts 32 are bondable with flange 12, once positioned inside apertures 14 (see Step 158). Step 155 may also include applying the epoxy adhesive to an inside diameter of apertures 14 on flange 12.

As shown in FIG. 8, the remaining steps of this method are similar to the method of FIG. 7. In Step 156, adhesive 28 is applied to flange 12, with holes 30 on adhesive 28 aligned with apertures 14 on flange 12. Next, in Step 158, doubler 24 is positioned over flange 12 such that inserts 32 are aligned with apertures 14. Inserts 32 are positioned inside apertures 14 and doubler 24 is attached to adhesive 28. In order to bond doubler 24 to flange 12, adhesive 28 is cured (Step 160) at the conditions described above under Step 110 of FIG. 7.

In the exemplary embodiments described herein, two adhesives are used to repair cracked arcuate flange 12. The first is adhesive 28 which attaches doubler 24 to flange 12. A suitable adhesive is a fluoroelastomer. The second adhesive is the epoxy adhesive coated on an outside diameter of inserts 32 to attach inserts 32 to apertures 14 of flange 12. A benefit of the method of FIG. 8 is that the epoxy adhesive may be cured at the same time and under the same conditions as adhesive 28 (step 160). Adhesive 28 and the epoxy adhesive on inserts 32 may then be post cured (Step 162) in a single step. In comparison, in the method of FIG. 7, the two adhesives are usually cured in separate steps. The adhesive on inserts 32 is typically cured after installing the inserts (Step 102). Adhesive 28 is cured after attaching doubler 24 to flange 12 (Step 110).

Finally, in step 164, excess adhesive around apertures 14 is removed.

An advantage of the method of FIG. 8 is an improved alignment of doubler 24 with flange 12 as a result of tack-welding inserts 32 inside holes 26 of doubler 24. Attaching inserts 32 inside holes 26 reduces variance between holes 26 on doubler 24 and apertures 14 on flange 12. In a method in which inserts 32 are positioned inside apertures 14 prior to attachment of doubler 24 to flange 12 (e.g. the method of FIG. 7), the epoxy adhesive is also typically cured prior to attaching doubler 24. At that point, inserts 32 are rigidly secured inside apertures 14. A position of each insert 32 inside each aperture 14 may vary somewhat across flange 12. Once the curing process is complete, inserts 32 are not adjustable within apertures 14. Moreover, each insert 32 is configured to extend beyond the surfaces of arcuate flange 12. Thus, for these reasons, it may be difficult to align holes 26 of doubler 24 with apertures 14 if inserts 32 are already bonded inside apertures 14. Alignment becomes increasingly more difficult as the size of the doubler increases.

In the method of FIG. 8, inserts 32 are tack-welded to doubler 24, and then inserts 32 may be positioned inside apertures 14 of flange 12 at the same step in which doubler 24 is placed on flange 12. As long as holes 26 on doubler 24 correspond to apertures 14 of flange 12, inserts 32 are easily inserted into apertures 14.

Three-hole doublers 24*a* and 24*b* are shown in FIG. 3, and four-hole doublers 24*c*, 24*d* and 24*e* are shown in FIG. 4. Doublers with more than four holes may also be used for the repair of cracks on flange 12. The method of FIG. 8 for installing doubler 24 to arcuate flange 12 is well-suited for larger-sized doublers since it ensures alignment of holes 26 on doubler 24 with apertures 14 on flange 12.

Figure 9:
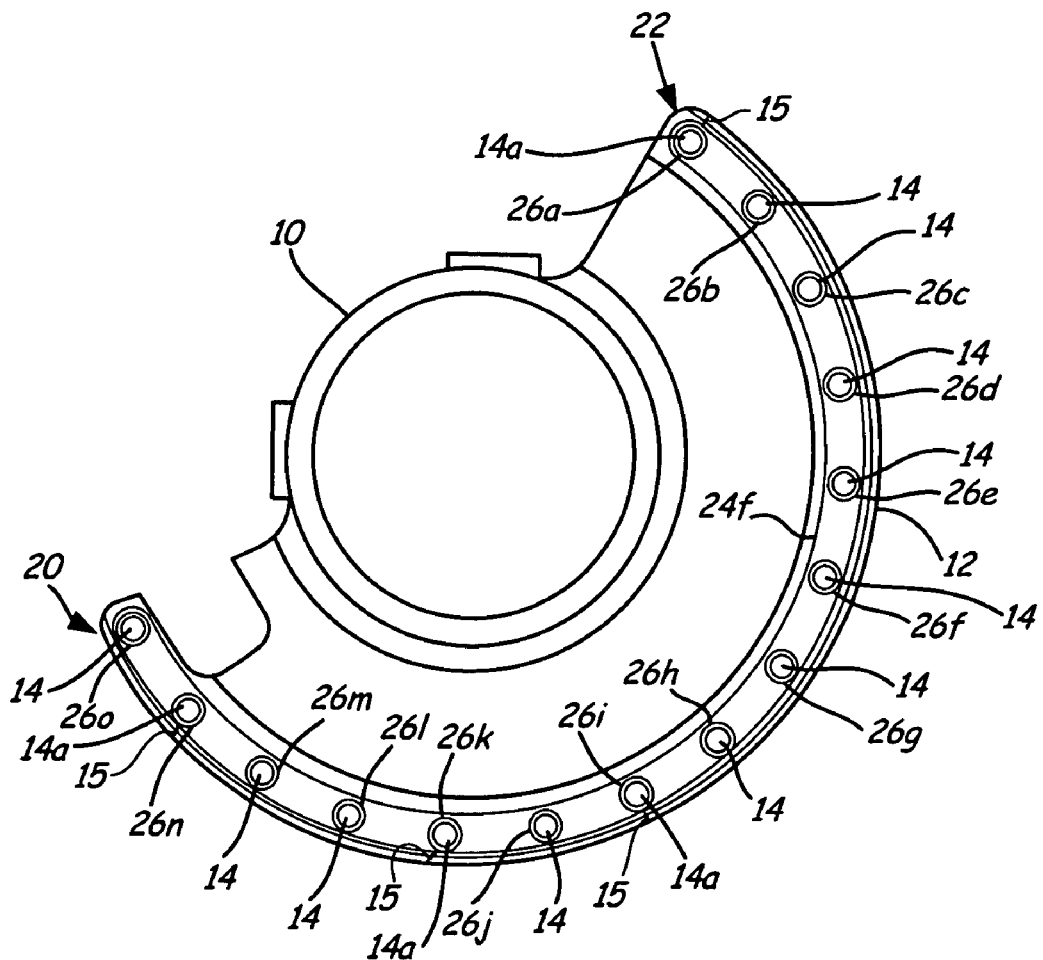
FIG. 9 is a top view of the arcuate flange having a full-flange doubler.

FIG. 9 shows a top view of arcuate flange illustrating an alternative embodiment of doubler 24. As illustrated in FIG. 9, doubler 24*f* is a full-flange doubler such that it covers all of apertures 14 on flange 12. In the embodiment shown in FIG. 9, arcuate flange 12 has fifteen apertures 14, four of which are damaged apertures 14*a*. Full-flange doubler 24*f* also has fifteen holes (26*a*-26*o*) that correspond to apertures 14 on flange 12. Because inserts 32 may be welded to holes 26 of doubler 24*f* before being inserted into apertures 14 on flange 12, inserts 32 and holes 26 are accurately aligned with apertures 14 on flange 12, and any variance in positioning inserts 32 in apertures 14 may be reduced or eliminated.

As shown in FIG. 9, flange 12 includes damaged aperture 14*a* at non-wing end 22 and damaged aperture 14*a* at wing end 20. In the embodiment shown in FIG. 9, doubler 24*f* is attached to flange 12 at wing end 20 and non-wing end 22. As described above, in another embodiment, flange 12 may be trimmed away at wing end 20 and/or non-wing end 22 to remove damaged apertures 14a. In that case, doubler 24f is assembled and attached to flange 12 in the same manner as described above; however, a portion of doubler 24f extends away from flange 12 at wing end 20 and/or non-wing end 22 in an area overlying the removed flange portion.

The doubler assembly of the present invention can be used to repair damaged apertures of various composite structures, such as those that are exposed to harsh environments.

Although the present invention has been described with reference to preferred embodiments, workers skilled in the art will recognize that changes may be made in form and detail without departing from the spirit and scope of the invention. For example, while three or four aperture doublers, as well as a full-flange doubler, were described, the doublers of this invention could have any number of apertures therein.

The invention claimed is:

1. A method of repairing a composite flange having at least one damaged aperture, the method comprising:
    attaching a repair structure to the flange using at least one adhesive, wherein the repair structure comprises:
        a doubler configured to cover the flange proximate to the damaged aperture; and
        an insert configured to be positioned within the damaged aperture, the at least one adhesive includes a first adhesive configured to bond the insert inside the damaged aperture; and
    curing the at least one adhesive to bond the repair structure to the flange.

2. The method of claim 1 wherein the doubler includes an aperture and the method further comprises:
    welding the insert to an inside of the aperture of the doubler, prior to attaching the repair structure to the flange.

3. The method of claim 1 wherein the first adhesive is an epoxy adhesive.

4. The method of claim 1 wherein the at least one adhesive includes a second adhesive configured to bond the doubler to the flange.

5. The method of claim 4 wherein the second adhesive is a fluoroelastomer.

6. A method of repairing a composite flange having a least one damaged aperture, the method comprising:
    forming a support structure having a plurality of apertures, wherein the plurality of apertures are configured to align with at least a portion of the apertures on the composite flange, including the at least one damaged aperture;
    attaching an insert inside each aperture of the support structure;
    applying a first fluoroelastomer adhesive to the composite flange;
    positioning at least a portion of the support structure on the adhesive;
    positioning at least a portion of the inserts inside the apertures of the composite flange; and
    curing the first adhesive to bond the support structure to the composite flange.

7. The method of claim 6 wherein attaching the insert inside the aperture of the support structure includes welding the insert to the aperture of the support structure.

8. The method of claim 6 further comprising:
    applying a second adhesive to an outside diameter of the inserts prior to curing the first adhesive such that curing of the first adhesive simultaneously cures the second adhesive to bond the inserts to the composite flange.

9. The method of claim 6 wherein the composite flange is C-shaped and has a first end and a second end.

10. The method of claim 9 wherein the at least one damaged aperture includes an aperture on the first end, and the method further comprises:
    removing a portion of the composite flange from the first end, prior to applying the first adhesive to the composite flange, wherein the removed portion of the composite flange includes a damaged aperture; and
    attaching a first portion of the support structure to the composite flange at an area proximate to the first end of the composite flange such that a second portion of the support structure is unattached to the composite flange and overlies an area where the composite flange was removed.

11. A method of repairing a composite flange having a least one damaged aperture, the method comprising:
    forming a support structure having a plurality of apertures, wherein the plurality of apertures are configured to align with at least a portion of the apertures on the composite flange, including the at least one damaged aperture;
    attaching an insert inside each aperture of the support structure;
    applying a first adhesive to the composite flange;
    positioning at least a portion of the support structure on the adhesive;
    positioning at least a portion of the inserts inside the apertures of the composite flange;
    applying a second adhesive to an outside diameter of the inserts prior to curing the first adhesive such that curing of the first adhesive simultaneously cures the second adhesive to bond the inserts to the composite flange; and
    curing the first adhesive to bond the support structure to the composite flange.

12. The method of claim 11 wherein the composite flange is C-shaped and has a first end and a second end.

13. The method of claim 12 wherein the at least one damaged aperture includes an aperture on the first end, and the method further comprises:
    removing a portion of the composite flange from the first end, prior to applying the first adhesive to the composite flange, wherein the removed portion of the composite flange includes a damaged aperture; and
    attaching a first portion of the support structure to the composite flange at an area proximate to the first end of the composite flange such that a second portion of the support structure is unattached to the composite flange and overlies an area where the composite flange was removed.

14. A method of repairing a composite flange having a least one damaged aperture, the method comprising:
    providing that the composite flange is C-shaped and has a first end and a second end;
    forming a support structure having a plurality of apertures, wherein the plurality of apertures are configured to align with at least a portion of the apertures on the composite flange, including the at least one damaged aperture;
    attaching an insert inside each aperture of the support structure;
    applying a first adhesive to the composite flange;
    positioning at least a portion of the support structure on the adhesive;
    positioning at least a portion of the inserts inside the apertures of the composite flange; and
    curing the first adhesive to bond the support structure to the composite flange.

15. The method of claim 14 wherein the at least one damaged aperture includes an aperture on the first end, and the method further comprises:
    removing a portion of the composite flange from the first end, prior to applying the first adhesive to the composite flange, wherein the removed portion of the composite flange includes a damaged aperture; and attaching a first portion of the support structure to the composite flange at an area proximate to the first end of the composite flange such that a second portion of the support structure is unattached to the composite flange and overlies an area where the composite flange was removed.

16. The method of claim 14 wherein the first adhesive is a fluoroelastomer.

17. The method of claim 14 wherein attaching the insert inside the aperture of the support structure includes welding the insert to the aperture of the support structure.

18. The method of claim 14 further comprising:

applying a second adhesive to an outside diameter of the inserts prior to curing the first adhesive such that curing of the first adhesive simultaneously cures the second adhesive to bond the inserts to the composite flange.

* * * * *

UNITED STATES PATENT AND TRADEMARK OFFICE
CERTIFICATE OF CORRECTION

PATENT NO. : 7,727,349 B2  Page 1 of 1
APPLICATION NO. : 11/897887
DATED : June 1, 2010
INVENTOR(S) : Holland et al.

It is certified that error appears in the above-identified patent and that said Letters Patent is hereby corrected as shown below:

In the TITLE, delete "DOUBLE", and insert --DOUBLER--

In column 1, line 1, delete "DOUBLE", and insert --DOUBLER--

In column 2, line 16, delete "doubler to the arcuate", and insert --doubler to the arcuate flange--

Signed and Sealed this

Twenty-seventh Day of July, 2010

David J. Kappos
*Director of the United States Patent and Trademark Office*